United States Patent
Li (10) Patent No.: US 8,721,180 B2
(45) Date of Patent: May 13, 2014

(54) LUBRICATING STRUCTURE FOR LINEAR MOTION GUIDE APPARATUS

(71) Applicant: Chia Yang Li, Taichung (TW)

(72) Inventor: Chia Yang Li, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 0 days.

(21) Appl. No.: 13/622,400

(22) Filed: Sep. 19, 2012

(65) Prior Publication Data

US 2014/0079345 A1   Mar. 20, 2014

(51) Int. Cl.
*F16C 33/10* (2006.01)
*F16C 29/06* (2006.01)

(52) U.S. Cl.
USPC .............................. 384/13; 384/43

(58) Field of Classification Search
USPC .................. 384/13, 15, 43–45, 49, 50; 184/5
See application file for complete search history.

(56) References Cited

U.S. PATENT DOCUMENTS

| | | | |
|---|---|---|---|
| 6,709,158 B2 * | 3/2004 | Ishihara | 384/44 |
| 7,044,641 B2 | 5/2006 | Scotte et al. | |
| 7,465,095 B2 * | 12/2008 | Agari et al. | 384/45 |
| 7,534,042 B2 * | 5/2009 | Kuwabara | 384/13 |
| 7,556,430 B2 | 7/2009 | Wu et al. | |
| 7,658,544 B2 | 2/2010 | Chen et al. | |
| 7,686,514 B2 | 3/2010 | Hung et al. | |
| 7,736,059 B2 | 6/2010 | Chen et al. | |
| 7,798,716 B2 * | 9/2010 | Haub | 384/13 |
| 7,927,016 B2 * | 4/2011 | Kuwabara | 384/13 |
| 8,082,814 B2 | 12/2011 | Jiang et al. | |
| 2003/0164264 A1 * | 9/2003 | Luo | 184/5 |
| 2006/0102427 A1 * | 5/2006 | Wu et al. | 184/5 |
| 2006/0231335 A1 * | 10/2006 | Lin et al. | 184/5 |
| 2008/0292226 A1 * | 11/2008 | Chen et al. | 384/15 |

* cited by examiner

*Primary Examiner* — James Pilkington
(74) *Attorney, Agent, or Firm* — Charles E. Baxley (57) ABSTRACT

A linear motion guide device includes a slider slidably attached onto a guide rail, an end cap having an inner side attached to the slider, a ball bearing device disposed between the slider and the guide rail, the end cap includes an inlet for receiving a lubricating fluid, two chambers formed in two legs, a groove communicating with the chambers of the end cap, and a casing having a compartment formed by an outer wall and communicating with the inlet of the end cap for receiving the lubricating fluid from the inlet of the end cap, and the outer wall of the casing is aligned with and directed toward the inlet of the end cap for resisting a flowing of the lubricating fluid.

7 Claims, 8 Drawing Sheets

LUBRICATING STRUCTURE FOR LINEAR MOTION GUIDE APPARATUS

BACKGROUND OF THE INVENTION

1. Field of the Invention

The present invention relates to a linear motion guide apparatus, and more particularly to a linear motion guide apparatus including a lubricating device or arrangement or structure designed and arranged to be easily and readily removed or disengaged from the mold device and to be used for suitably dissipating the fluid pressure of the lubricant or lubricating oil or fluid and for preventing the lubricant or lubricating oil or fluid from flowing out of the linear motion guide apparatus.

2. Description of the Prior Art

Various kinds of typical linear motion guide devices have been developed and comprise a slider or slide block slidably attached onto a guide rail, and normally, a ball bearing device is disposed between the slider and the guide rail for facilitating the sliding movement between the slider and the guide rail and for allowing the slider and the guide rail to be smoothly moved relative to each other.

For example, the applicant has also developed various kinds of typical linear motion guide devices or apparatuses as disclosed in the following patents, U.S. Pat. No. 7,044,641 to Scotte et al., U.S. Pat. No. 7,556,430 to Wu et al., U.S. Pat. No. 7,658,544 to Chen et al., U.S. Pat. No. 7,686,514 to Hung et al., U.S. Pat. No. 7,736,059 to Chen et al., and U.S. Pat. No. 8,082,814 to Jiang et al. disclose several of the typical linear motion rolling guide units or devices or apparatuses each comprising a slider or slide block slidably attached onto a guide rail, and a ball bearing device disposed and engaged between the slider and the guide rail and engaged in the endless ball guiding raceway for facilitating the sliding movement between the slider and the guide rail and for allowing the slider and the guide rail to be smoothly moved relative to each other.

Normally, the slider and the guide rail and/or the ball bearing device are moved in a fast speed relative to each other, and a lubricating device is required to be provided or disposed or engaged in the slider and/or the guide rail for filling or supplying the lubricant or lubricating oil or fluid into the endless ball guiding raceway and the slider for suitably lubricating the ball bearing device.

However, the lubricant or lubricating oil or fluid is normally required to be filled or supplied into the endless ball guiding raceway with a greater or higher pressure, and the lubricant or lubricating oil or fluid may have a good chance to flow out through the gaps formed between the parts or elements of the linear motion guide apparatus.

The present invention has arisen to mitigate and/or obviate the afore-described disadvantages of the conventional lubricating structures or devices for linear motion guide devices.

SUMMARY OF THE INVENTION

The primary objective of the present invention is to provide a linear motion guide apparatus including a lubricating device or arrangement or structure designed and arranged to be easily and readily removed or disengaged from the mold device and to be used for suitably dissipating the flowing pressure of the lubricant or lubricating oil or fluid and for preventing the lubricant or lubricating oil or fluid from flowing out of the linear motion guide apparatus.

In accordance with one aspect of the invention, there is provided a linear motion guide apparatus comprising a guide rail, a slider slidably attached onto the guide rail for moving along the guide rail, a ball bearing device disposed between the slider and the guide rail for facilitating a sliding movement between the slider and the guide rail, and an end cap including a first side attached to and engaged with the slider and including a second side faced away from the slider, the end cap including a channel formed therein and defined between two legs for slidably receiving and engaging with the guide rail, and including an inlet formed in the end cap for receiving a lubricating fluid, and including two chambers formed in the legs and located in the first side of the end cap respectively, and including a groove formed in the first side of the end cap and defined by a rib and communicating with the chambers of the end cap, and including a casing located in the first side of the end cap and having a compartment formed in the casing and defined by an outer wall and communicating with the inlet of the end cap for receiving the lubricating fluid from the inlet of the end cap, the compartment of the casing being communicating with the groove and the chambers of the end cap for supplying the lubricating fluid into the groove and the chambers of the end cap and for lubricating the ball bearing device, and the outer wall of the casing being aligned with and directed toward the inlet of the end cap for resisting a flowing of the lubricating fluid and for decreasing the flowing speed of the lubricating fluid and for preventing the lubricating fluid from flowing out through the gaps that may be formed between the parts or members or elements of the linear motion guide apparatus.

The inlet of the end cap includes a circular cross section, and the outer wall of the casing includes a circular cross section similar to that of the inlet of the end cap. The inlet of the end cap includes an inner diameter (d), and the outer wall of the casing includes an outer diameter (D) similar to the inner diameter (d) of the inlet of the end cap.

The rib of the end cap is contacted and engaged with the slider. The casing of the end cap is contacted and engaged with the slider. The end cap includes a pathway formed in the first side of the end cap and communicating with the compartment of the casing. The slider includes four conduits formed therein and communicating with the chambers of the end cap.

The slider includes four ball guiding members each having a tube engaged into the conduit of the slider respectively, and the tubes each include a bore formed therein for receiving the ball bearing device. The ball guiding members of the slider each include an elbow engaged in the chamber of the end cap.

A dust cap may further be provided and attached to the end cap, and a mouth piece attached to the dust cap and engaged into the inlet of the end cap for supplying the lubricating fluid into the inlet of the end cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
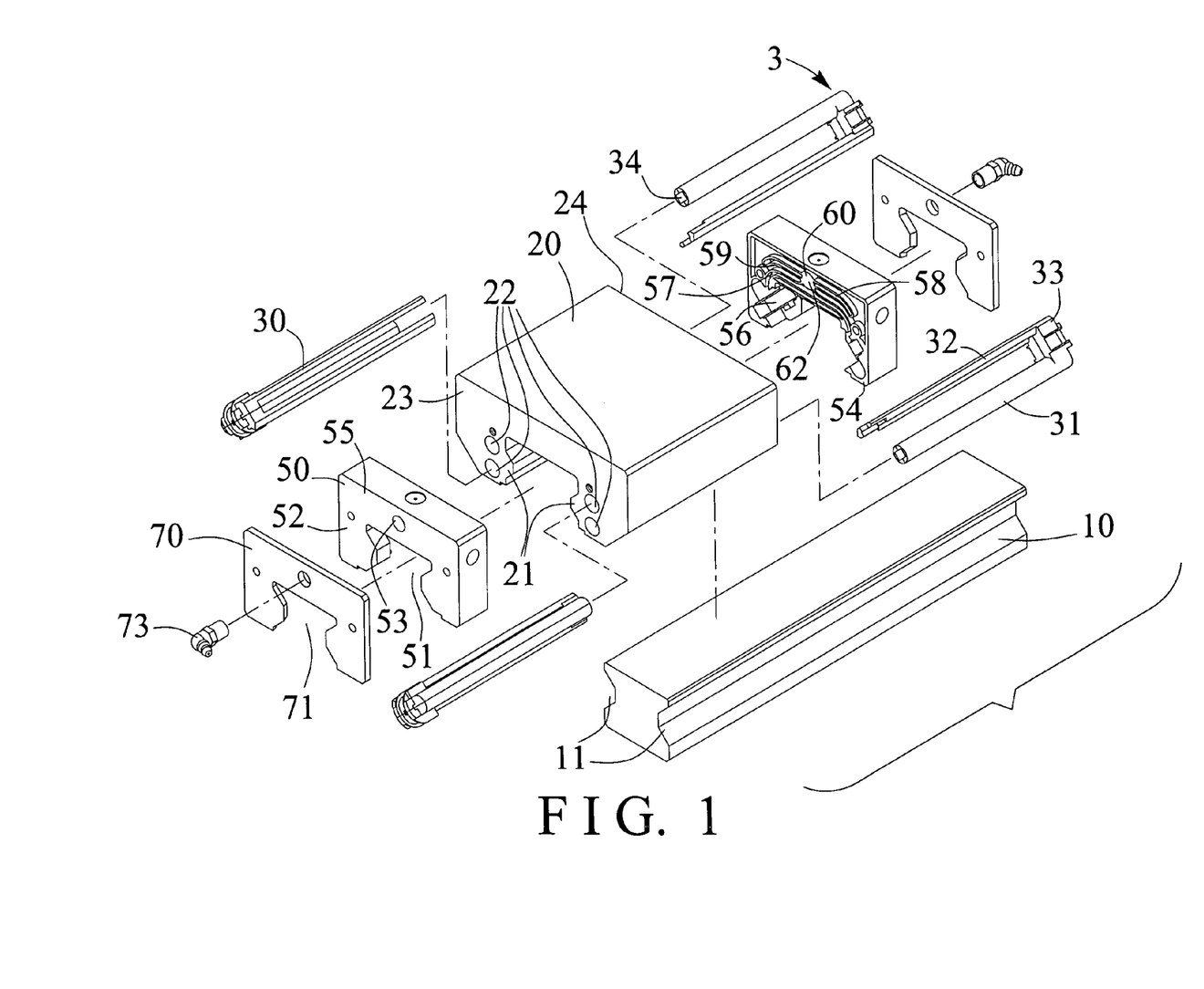
FIG. 1 is a partial exploded view of a linear motion guide apparatus in accordance with the present invention.
Figure 2:
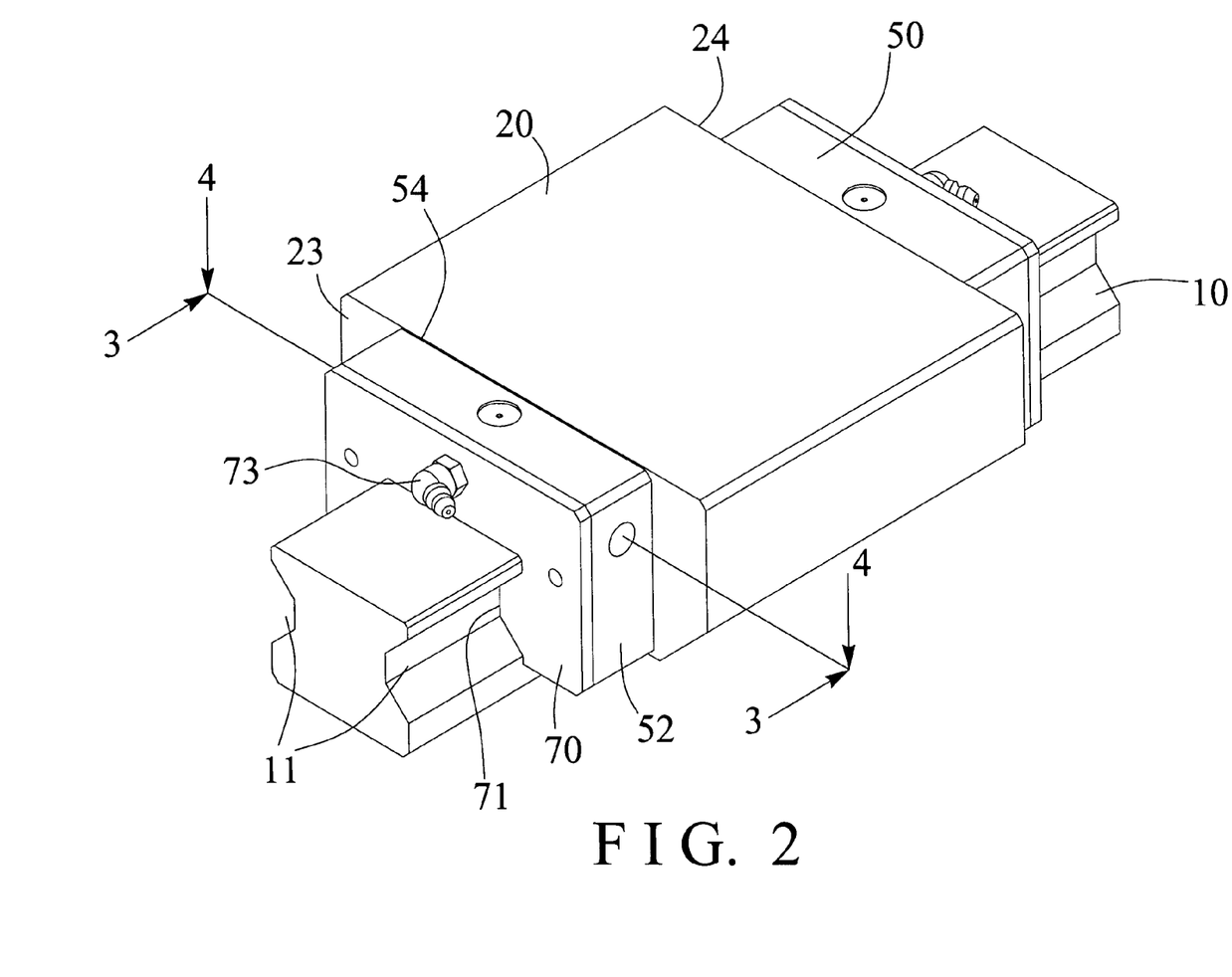
FIG. 2 is a perspective view of the linear motion guide apparatus.
Figure 3:
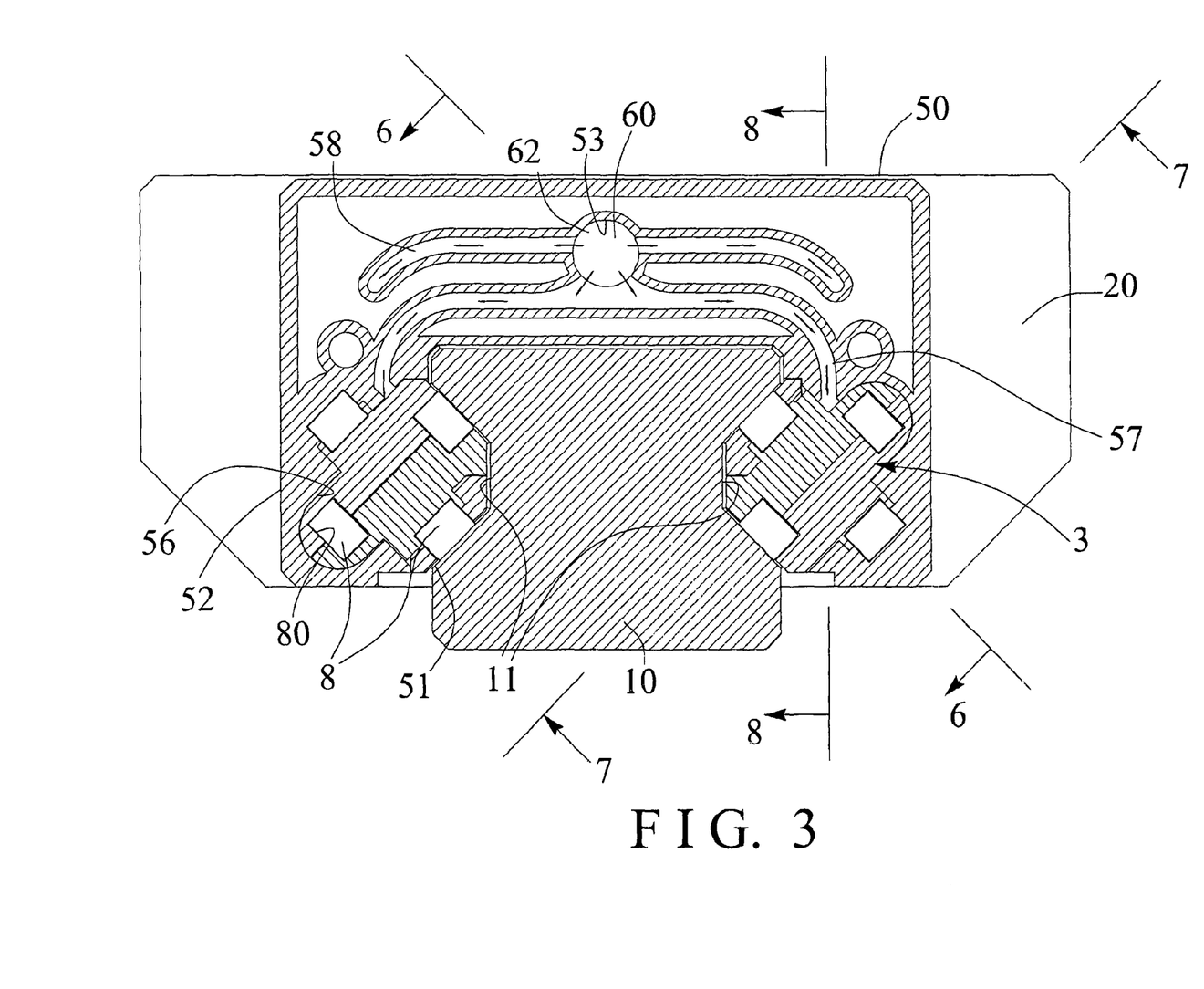
FIG. 3 is a cross sectional view of the linear motion guide apparatus taken along lines 3-3 of FIG. 2.

Referring to the drawings, and initially to FIGS. 1-3, a linear motion guide apparatus in accordance with the present invention comprises a guide rail 10 including a substantially I-shaped cross section having two longitudinal recesses 11 formed in the side portions thereof, a slide block or a slider 20 slidably attached onto the guide rail 10 and arranged to be moved along the guide rail 10, and normally, and a ball bearing device 8 (FIGS. 3, and 6-8) disposed between the slider 20 and the guide rail 10 for facilitating the sliding movement between the slider 20 and the guide rail 10 and for allowing the slider 20 and the guide rail 10 to be smoothly moved relative to each other. The slider 20 includes two opposite and longitudinal projections or bulges or protrusions 21 extended therefrom for engaging onto the longitudinal recesses 11 of the guide rail 10 respectively and for guiding the slider 20 and the guide rail 10 to smoothly move relative to each other.

The slider 20 further includes two pairs or four longitudinal conduits 22 formed therein (FIGS. 1, 6, 7) and formed through the length of the slider 20 and opened through the end portions 23, 24 of the slider 20 for receiving or engaging with a ball guiding member or device 3, for example, the ball guiding device 3 includes two pairs or four ball guiding members 30 each having a longitudinal duct or tube 31 for receiving or engaging into the conduits 22 of the slider 20 respectively, and each having a lock or latch or retainer device 32 connected or coupled to the tube 31 with a connecting or coupling or deflecting member or elbow 33 and parallel to the tube 31, and the tubes 31 each include a bore 34 formed therein for forming or defining one or more endless ball guiding raceways 80 (FIGS. 6, 7) in or between the slider 20 and the guide rail 10 and for receiving or engaging with the ball bearing device 8.

The retainer devices 32 of the ball guiding device 3 may be used for engaging with the slider 20 and for firmly and solidly and stably attaching or mounting or securing or anchoring or retaining or coupling to the ball guiding device 3 to the slider 20. The deflecting members or elbows 33 of the ball guiding device 3 each also include a curved or deflecting passage 35 formed therein (FIGS. 6, 7) and communicating with the bores 34 of the tubes 31 for forming or defining the endless ball guiding raceways 80 and for receiving or engaging with the ball bearing device 8. One example of the arrangement and engagement of the ball guiding device 3 to the slider 20 has been disclosed in U.S. Pat. No. 7,044,641 to Scotte et al. which may be taken as a reference for the present invention.

The linear motion guide apparatus in accordance with the present invention further includes two housings or casings or end caps 50 and two wipers or dust caps 70 disposed or attached or mounted or secured onto the two sides or the outer portions or the end portions 23, 24 of the slider 20 respectively, the end caps 50 and the dust caps 70 each include a channel 51, 71 formed in the lower portion thereof and formed or defined between two legs 52 for slidably receiving or engaging onto the guide rail 10 and for guiding the end caps 50 and the dust caps 70 to smoothly move relative to the guide rail 10. The end caps 50 each include an entrance or inlet 53 formed therein (FIGS. 1, 4, 6), and a mouth piece 73 is attached or mounted or secured onto each of the dust caps 70 and engaged into the inlet 53 of the end cap 50 for filling or supplying the lubricant or lubricating oil or fluid into the end caps 50 and the endless ball guiding raceways 80 and for lubricating the ball bearing device 8.

As shown in FIGS. 1 and 3-5, the end caps 50 each include a first end portion or first side 54 facing or directing toward the end portion 23, 24 of the slider 20 for contacting and engaging onto or with the end portion 23, 24 of the slider 20 respectively, and a second end portion or second side 55 facing or directing away from the end portion 23, 24 of the slider 20 for contacting and engaging onto or with the dust cap 70 respectively, and each include two chambers 56 formed in the legs 52 respectively and formed and disposed or provided or located in the first side 54 of the end cap 50 and communicating with the respective conduits 22 of the slider 20 for receiving or engaging with the deflecting members or elbows 33 of the ball guiding device 3 respectively and for firmly and solidly and stably anchor or latch or retain or position or couple or secure the ball guiding members 30 in the slider 20 and between the end caps 50.

The end caps 50 each further include one or more (such as two) grooves 57 and one or more (such as two) pathways 58 formed in the first side 54 thereof and formed or defined by or with or between fences or ribs 59, a frame or casing 60 formed or provided in the first side 54 thereof and having a compartment 61 formed therein and formed or defined by an outer wall 62 which is aligned with and/or faced or directed toward the inlet 53 of the end cap 50 and connected or coupled to the ribs 59, in which the compartment 61 of the casing 60 is communicating with the grooves 57 and the pathways 58 of the respective end caps 50 (FIGS. 3, 4) for allowing the lubricating fluid from the inlet 53 of the end cap 50 to flow into the compartment 61 of the casing 60 and confined or stopped by the outer wall 62 of the casing 60 and then guided to flow into the grooves 57 and the pathways 58 of the respective end caps 50, and then to flow into the chambers 56 of the end caps 50 (FIG. 5), and then to flow into the endless ball guiding raceways 80 and for lubricating the ball bearing device 8.

Figure 4:
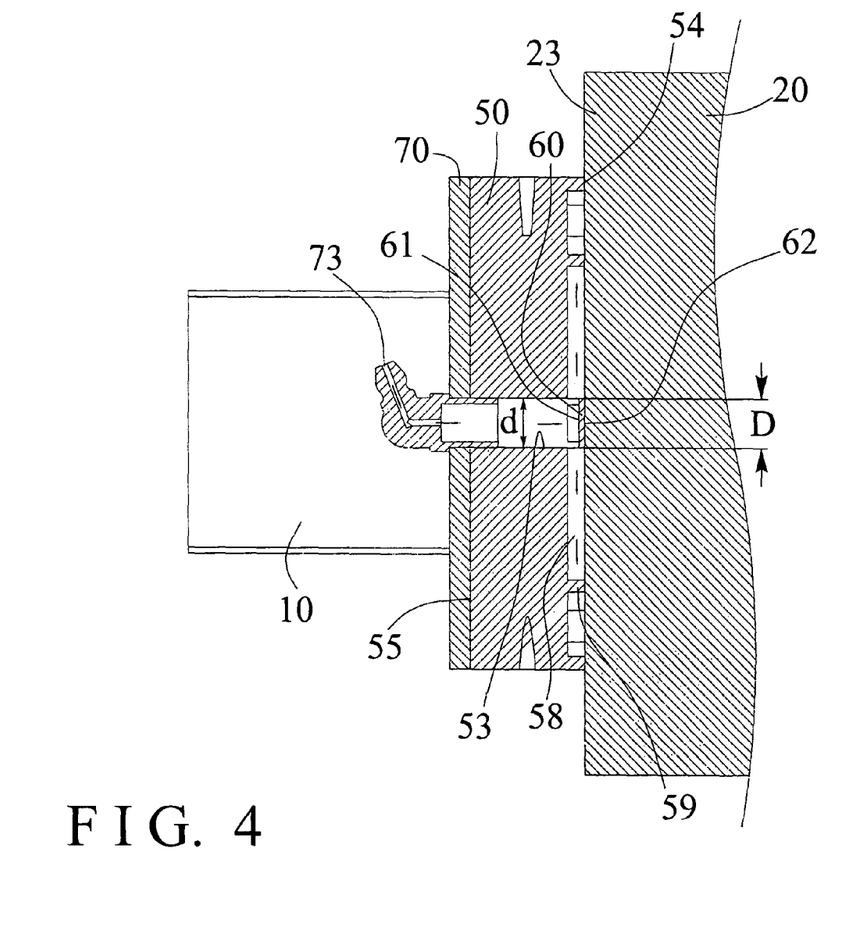
FIG. 4 is a partial cross sectional view of the linear motion guide apparatus taken along lines 4-4 of FIG. 2, illustrating the operation of the linear motion guide apparatus.
Figure 5:
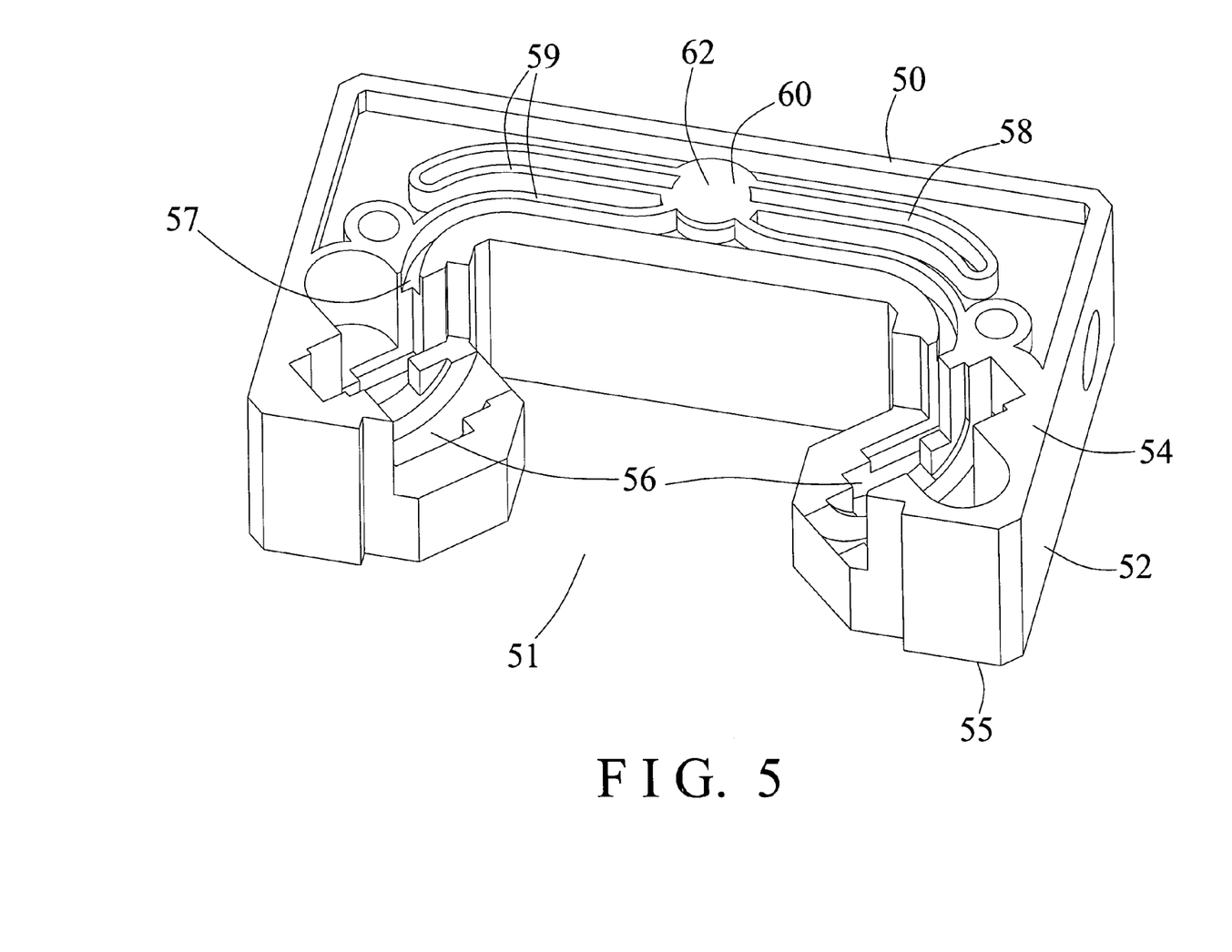
FIG. 5 is a perspective view illustrating an end cap of the linear motion guide apparatus.
Figure 6:
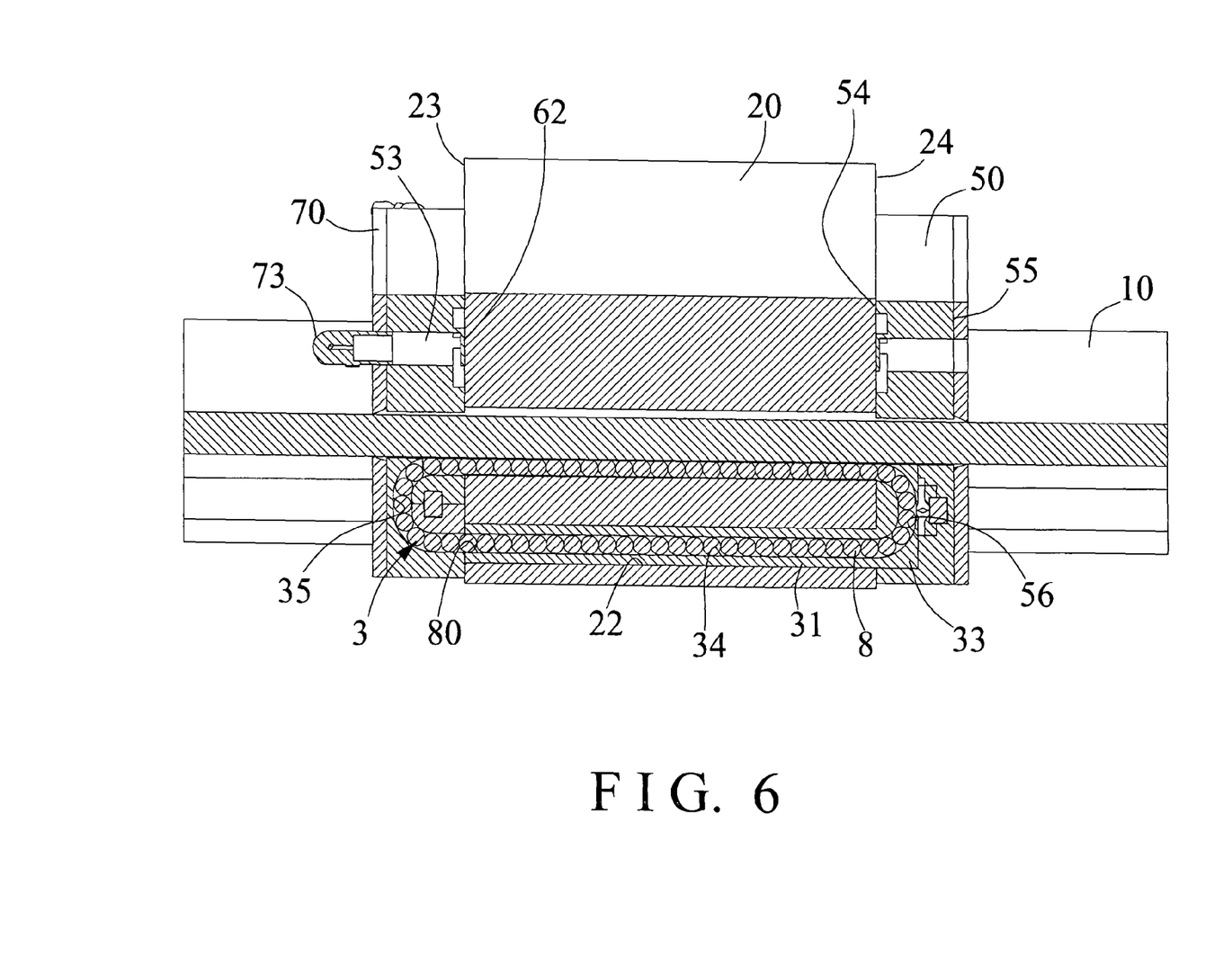
FIGS. 6, 7, 8 are cross sectional views of the linear motion guide apparatus taken along lines 6-6, 7-7, 8-8 of FIG. 3 respectively.
Figure 7:
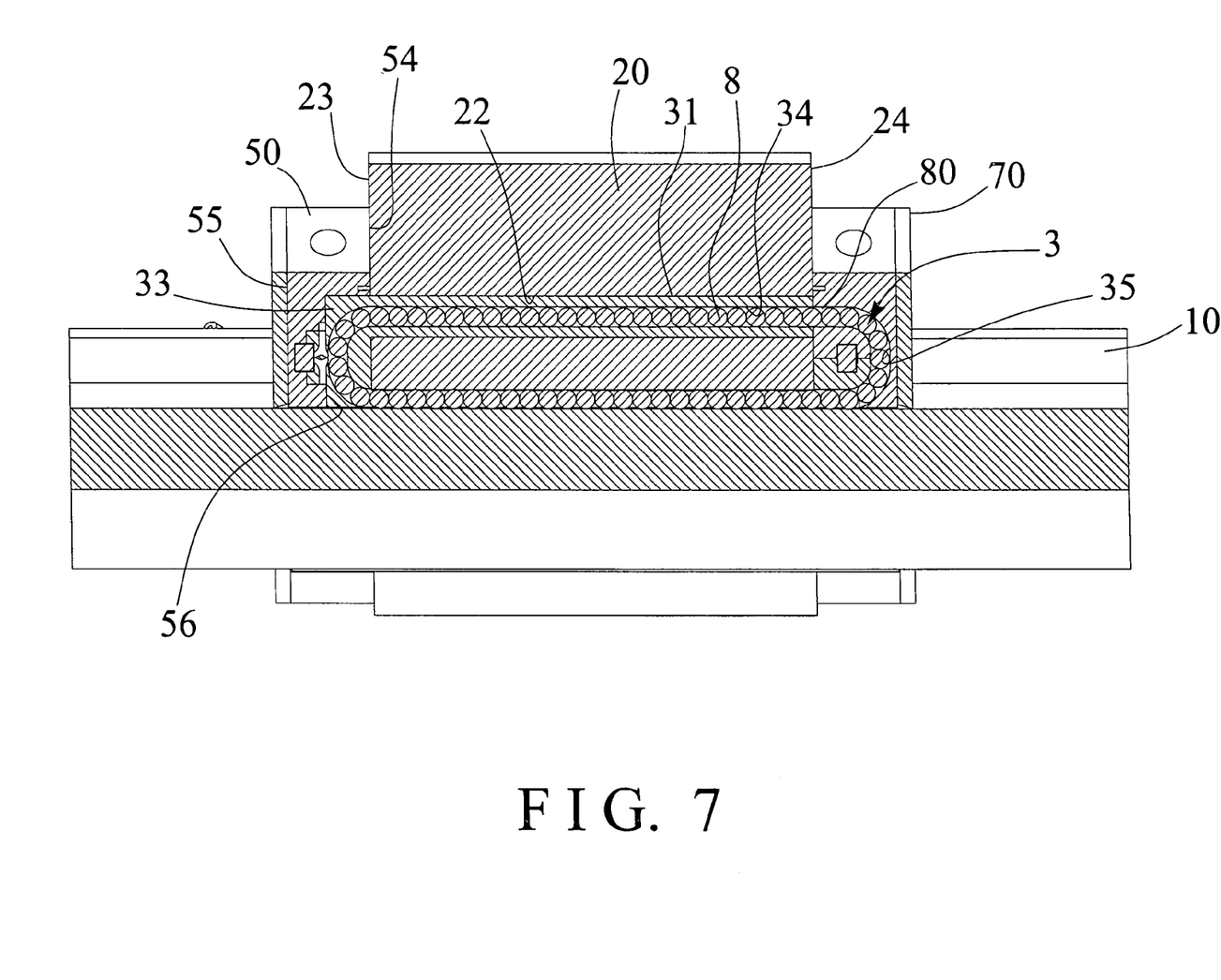
Figure 8:
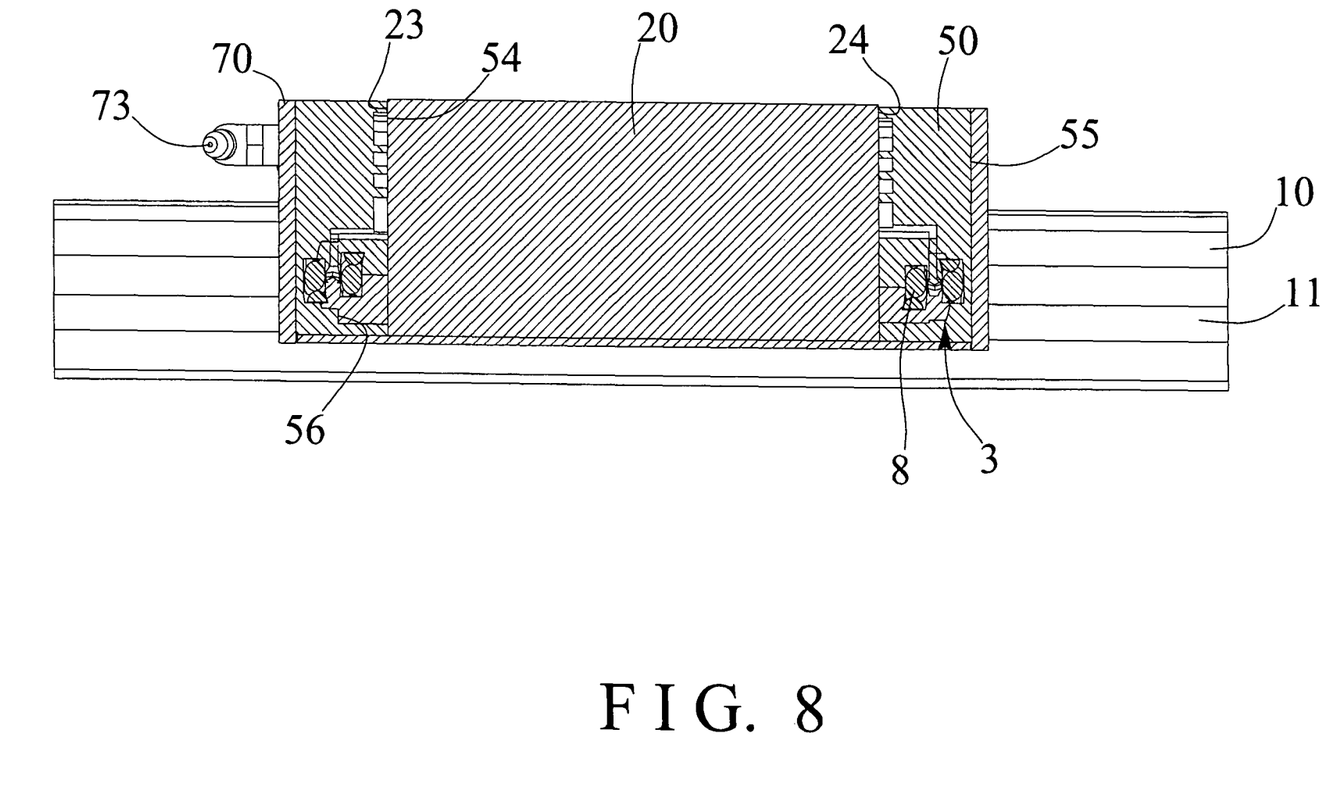

It is to be noted that the first side 54 of the end cap 50 and the ribs 59 and/or the casings 60 of the end caps 50 are contacted and engaged onto or with the end portion 23, 24 of the slider 20 respectively, best shown in FIG. 4, and the grooves 57 and the pathways 58 of the end caps 50 will thus be formed and defined between the end cap 50 and the slider 20. It is preferable that the inlet 53 of the end cap 50 includes a circular cross section (FIGS. 1, 3), and the outer wall 62 of the casing 60 also includes a substantially circular cross section similar to or identical to that of the inlet 53 of the end cap 50, and includes an outer diameter (D) similar to or identical to the inner diameter (d) of the inlet 53 of the end cap 50 (FIG. 4) such that the outer wall 62 of the casing 60 is faced or directed toward the inlet 53 of the end cap 50 and contacted and engaged with the slider 20 for blocking or shielding or stopping and resisting the lubricating fluid and for preventing the lubricating fluid from directly flowing onto the slider 20 and thus for preventing the lubricating fluid from flowing out through the contacting and engaging portion between the end cap 50 and the slider 20.

In operation, as shown in FIG. 4, the lubricating fluid from the mouth piece 73 may flow into the compartment 61 of the casing 60 and then may flow onto the outer wall 62 of the casing 60 which is aligned with and/or faced or directed toward the inlet 53 of the end cap 50 and may be used to block or stop and resist the lubricating fluid and to prevent the lubricating fluid from directly flowing onto the slider 20 and thus for preventing the lubricating fluid from flowing out through the contacting and engaging portion between the end cap 50 and the slider 20, the lubricating fluid may then be guided to flow into the grooves 57 and the pathways 58 of the end cap 50, and may then be guided to flow into the chambers 56 of the end caps 50 (FIGS. 3, 5), and may then be guided to flow into the endless ball guiding raceways 80 that are formed in or between the slider 20 and the guide rail 10, and for lubricating the ball bearing device 8. The formation and the provision of the grooves 57 and the pathways 58 in the end cap 50 may include a greater volume or space and may be used to receive and accommodate the lubricating fluid and may slow the flowing speed of the lubricating fluid.

Accordingly, the linear motion guide apparatus in accordance with the present invention includes a lubricating device or arrangement or structure designed and arranged to be easily and readily removed or disengaged from the mold device and to be used for suitably dissipating the flowing pressure of the lubricant or lubricating oil or fluid and for preventing the lubricant or lubricating oil or fluid from flowing out of the linear motion guide apparatus.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A linear motion guide apparatus comprising:
   a guide rail,
   a slider slidably attached onto said guide rail for moving along said guide rail,
   a ball bearing device disposed between said slider and said guide rail for facilitating a sliding movement between said slider and said guide rail,
   an end cap comprising:
      a first side attached to and engaged with said slider,
      a second side faced away from said slider,
      a channel formed therein and defined between two legs for slidably receiving and engaging said guide rail,
      an inlet for receiving a lubricating fluid,
      each of said legs comprising a chamber located in said first side of said end cap,
      a groove formed in said first side of said end cap and defined by a rib and communicating with said chambers of said end cap,
      a casing located in said first side of said end cap, said casing comprising a compartment, said compartment of said casing communicating with said inlet of said end cap for receiving the lubricating fluid from said inlet of said end cap, and said compartment of said casing communicating with said groove for supplying the lubricating fluid from said compartment to said chambers of said end cap for lubricating said ball bearing device,
   said rib of said end cap being in contact with said slider,
   said compartment of said casing being defined by an outer wall which is in contact with said slider, and said outer wall of said casing being connected to said rib and aligned with said inlet of said end cap for resisting a flowing of the lubricating fluid,
   said end cap including a pathway formed in said first side of said end cap and communicating with said compartment of said casing, and
   a mouth piece engaged into said inlet of said end cap for supplying the lubricating fluid into said inlet of said end cap.

2. The linear motion guide apparatus as claimed in claim 1, wherein said inlet of said end cap includes a circular cross section, and said outer wall of said casing includes a circular cross section similar to that of said inlet of said end cap.

3. The linear motion guide apparatus as claimed in claim 1, wherein said inlet of said end cap includes an inner diameter (d), and said outer wall of said casing includes an outer diameter (D) similar to said inner diameter (d) of said inlet of said end cap.

4. The linear motion guide apparatus as claimed in claim 1, wherein said slider includes four conduits formed therein and communicating with said chambers of said end cap.

5. The linear motion guide apparatus as claimed in claim 4, wherein said slider includes four ball guiding members each having a tube engaged into said conduit of said slider respectively, and said tubes each include a bore formed therein for receiving said ball bearing device.

6. The linear motion guide apparatus as claimed in claim 5, wherein said ball guiding members of said slider each include an elbow engaged in said chamber of said end cap.

7. The linear motion guide apparatus as claimed in claim 1 further comprising a dust cap attached to said end cap, and said mouth piece being attached to said dust cap and engaged into said inlet of said end cap for supplying the lubricating fluid into said inlet of said end cap.

* * * * *